US006816106B1

(12) United States Patent
Butler (10) Patent No.: US 6,816,106 B1
(45) Date of Patent: *Nov. 9, 2004

(54) IDENTIFICATION AND LOCATION SYSTEM FOR PERSONNEL AND VEHICLES

(76) Inventor: Walker Butler, 5326 E. Voltaire Ave., Scottsdale, AZ (US) 85254

( * ) Notice: Subject to any disclaimer, the term of this patent is extended or adjusted under 35 U.S.C. 154(b) by 0 days.

This patent is subject to a terminal disclaimer.

(21) Appl. No.: 10/430,167

(22) Filed: May 6, 2003

(51) Int. Cl.[7] ............................................. G01S 13/78
(52) U.S. Cl. ........................... 342/45; 342/50; 342/56; 342/57; 342/58
(58) Field of Search ........................... 342/43, 45, 46, 342/57, 58, 357.01, 357.06–357.09, 357.1, 357.12, 386, 450

(56) References Cited

U.S. PATENT DOCUMENTS

| | | | | |
|---|---|---|---|---|
| 3,573,823 A | * | 4/1971 | French | 342/43 |
| 3,846,797 A | * | 11/1974 | Brown et al. | 342/45 |
| 5,216,429 A | * | 6/1993 | Nakagawa et al. | 342/45 |
| 5,486,830 A | * | 1/1996 | Axline et al. | 342/43 |
| 5,568,152 A | * | 10/1996 | Janky et al. | 342/357.08 |
| 5,636,245 A | * | 6/1997 | Ernst et al. | 375/259 |
| 5,652,588 A | * | 7/1997 | Miron | 342/58 |
| 6,181,272 B1 | * | 1/2001 | Kirk | 342/45 |
| 6,427,121 B2 | * | 7/2002 | Brodie | 701/213 |
| 2001/0006372 A1 | * | 7/2001 | Lemelson et al. | 342/45 |

* cited by examiner

Primary Examiner—Thomas H. Tarcza
Assistant Examiner—Isam Alsomiri
(74) Attorney, Agent, or Firm—Don Carnegie (57) ABSTRACT

An identification interrogator is provided for surveillance of objects within an area. The identification interrogator transmits interrogation signals to all objects within the surveillance area, the reflections of which are received back by the interrogator to determine the locations of the objects, and communicates the determined locations to a processing facility to determine their authorized locations. Upon receipt of interrogation signals, some of the objects within the surveillance area broadcast their position and identification to processing facility for correlation with the locations determined by the reflection signals. The locations of other objects are found by correlating the location determined by the reflection signal with a predetermined list of objects and their location within the surveillance area. These may be objects with no means or method to transmit position and identification information, such as rock formations or buildings. If no broadcast information is received from an object and the location of that object determined by the reflection signal cannot be correlated with a predetermined list, than the object has no proper authorization to be within the surveillance area.

9 Claims, 5 Drawing Sheets

IDENTIFICATION AND LOCATION SYSTEM FOR PERSONNEL AND VEHICLES

BACKGROUND OF THE INVENTION (1) Field of the Invention

The present invention relates generally to surveillance systems, and in particular to a surveillance system used in conjunction with a device to provide location and identification of friendly personnel or vehicle targets.

(2) Description of Related Art

Surveillance systems for the detection of personnel and vehicles within sensitive or secured areas are being deployed in significant numbers due to increased concern for security and also due to the availability of effective, affordable sensors. These sensors may use detection methods, and may operate over distances and in environmental conditions that make it impossible for the surveillance system to achieve a detailed identification of each detected target. A "friendly" target is defined as an entity that is authorized to conduct activities within the area. "Unfriendly" targets are not authorized to be in the area and thus are assumed to be hostile. A way must be provided to differentiate between these two classes of targets.

One prior art method of determining the identity of friendly airborne targets is to couple to the surveillance radar antenna a separate antenna that transmits an interrogation signal into the same volume being searched by the radar. A cooperating, friendly aircraft carries on board a transponder that receives the interrogation signal and, after a small delay, responds with a coded reply. The reply may contain specific aircraft identification and altitude or other information. The time delay between sending the interrogation signal and receipt of the reply is used to determine the range to the friendly target. The target identification is then correlated with the skin return detected by the radar, if such detection has occurred. The interrogation signal and transponder reply are typically generated at frequencies that are much different from the radar operating frequency. An aircraft detected by the surveillance radar that does not respond to the interrogation with a proper reply can be labeled a "foe" target. Other prior art IFF techniques have used the surveillance radar signal as the interrogation signal with an appropriate transponder reply on a different frequency. In each of these cases the interrogation and reply signals are typically produced in the microwave region of the radio frequency spectrum, and the transponder must be capable of generating a reply of sufficient microwave power to be received at the radar site. These prior art methods are not practical for use in a surveillance sensor designed to detect personnel and vehicles within sensitive areas having typical dimensions of a kilometer or less.

A prior art example of a data communication network used to provide location information of a multiplicity of friendly entities as well as an IFF function is provided by U.S. Pat. No. 6,181,272 to Kirk. This patent describes a method using a central control station that transmits position requests to one or more field agents. Each of the field agents determine their position by use of a global positioning system (GPS) receiver and reply to the position request with a message that may include location, identification and a code. The central control station includes a receiver to collect the incoming data, a computer and a display to provide a graphical indication of the locations of all participating agents. When it is desired to confirm the "friendly" status of any replying agent, a laser designator is directed to the location of the agent. Each agent carries a laser detector that causes an encrypted response to be sent back to the central control station. This data communication network can determine the GPS coordinates of all participating agents, but the location accuracy of the replying agent is limited to the accuracy of a GPS receiver operating autonomously. Further GPS receivers are not always able to provide a valid location as GPS satellite geometry and features may preclude a valid GPS solution.

These prior art examples have several limitations if an attempt is made to apply them for both detection of unauthorized intruders and identification of authorized entities within a secured area having dimensions in the order of a kilometer. The radar and IFF system for airborne applications usually requires a separate interrogation transmitter and microwave receiver at the radar site to stimulate and receive responses from IFF equipped aircraft. The IFF units are not easily reconfigured as man carried, low power consumption devices that typically operate at a range of less than a kilometer from the surveillance radar. The method taught by Kirk patent requires a laser interrogator for positive identification of participating agents. It is capable of determining the location of participating agents only, and has no capability to detect hostile intruders. Further, it does not present a display of the relative position of the responding agents with respect to various physical structures, etc. within the area unless a map overlay is added to the display. For these and other reasons, a method or a means of target Identification—Friend or Foe (IFF) is needed that is compatible with surveillance sensors and systems used for security purposes.

SUMMARY OF THE INVENTION

The present invention provides a new and improved method for detecting the presence of vehicles and personnel within a secured area, and for determining if a detected target is a "friend" or "foe". It is an advantage of the present invention that the IFF unit carried by each authorized entity is light in weight and consumes a relatively small amount of power, thus minimizing the weight of the included batteries. It is also an advantage of the present invention that each IFF unit is capable of uniquely identifying the authorized person to which it is assigned, as well as its GPS derived position. It is still another advantage of the present invention that the only additional equipment that is required at the site of the surveillance radar is a GPS receiver and a data communication unit. This data communication unit receives identification and position data from the IFF units, and transmits IFF unit data and surveillance radar detection data to a processing facility. The processing facility has means to display a depiction of both the physical features of the secured area and the location and identification of each authorized entity. Any additional targets detected can be assumed hostile.

An additional advantage of the present invention is that computation of the range and bearing from the GPS receiver located at the radar to each of the IFF units allows determination of the IFF unit position from the radar to an accuracy of substantially one square meter.

The IFF unit includes a GPS receiver, a radar receiver, a memory module containing identification data unique to that unit, and a communication link transmitter. As the radar scans the secured area, the main beam briefly impinges upon each IFF unit. The radar receiver determines when the main beam event occurs and commands the communication link transmitter to transmit message containing the unit's identification and GPS derived coordinates. The present invention makes maximum use of commercially available, off the shelf subsystems, including the GPS receivers, the communication link transmitters within the IFF units, the surveillance radar, the data communication unit, and a personal computer for the radar display. This use of commercially available subsystem keeps the overall cost of the present invention to a minimum, as well as minimum size and powers consumption of subsystems included in the IFF units.

These and other objects, features, aspects, and advantages of the invention will be apparent to those skilled in the art from the following detailed description of preferred non-limiting embodiments, taken together with the drawings and the claims that follow.

BRIEF DESCRIPTION OF THE DRAWINGS

It is to be understood that the drawings are to be used for the purposes of illustration only and not as a definition of the limits of the invention.

Referring to the drawings in which like reference numbers present corresponding parts throughout.

DETAILED DESCRIPTION OF PREFERRED EMBODIMENT

Figure 1:
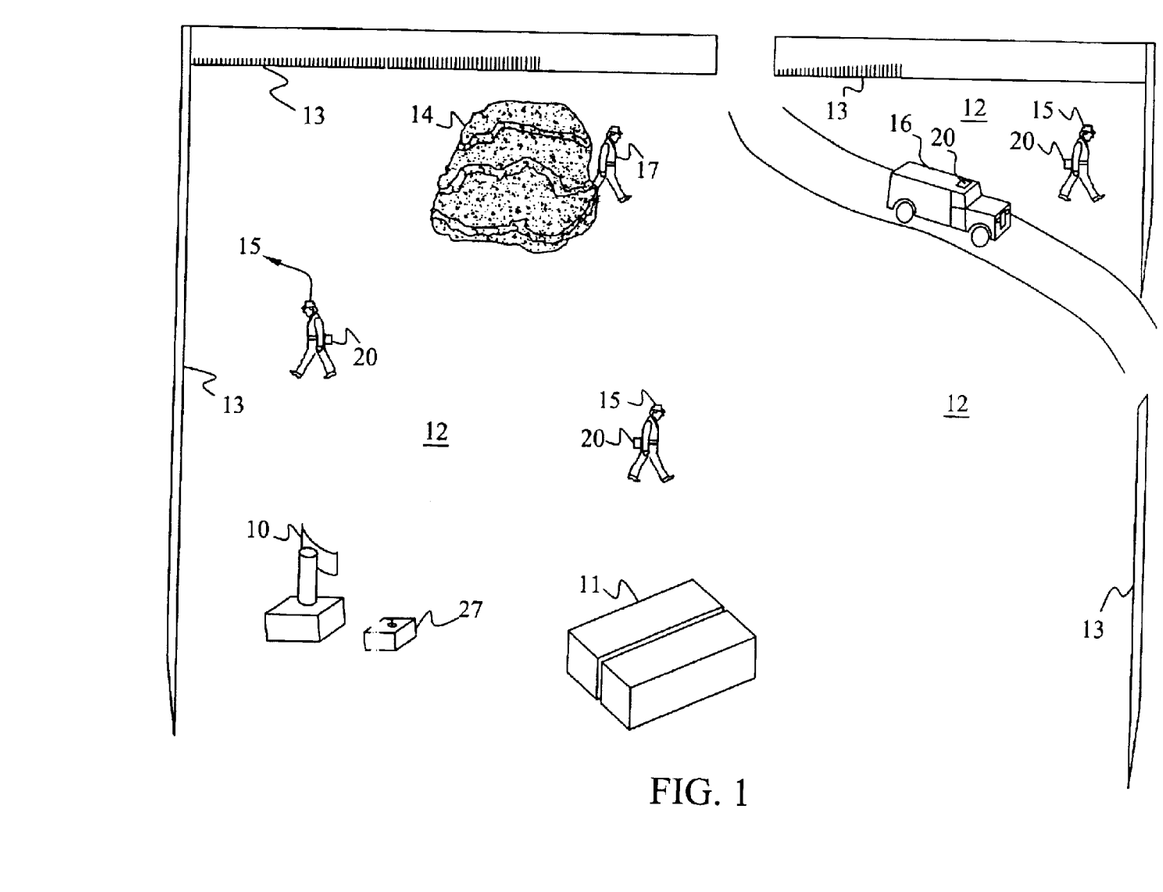
FIG. 1 illustrates the use of a surveillance sensor to detect the presence of friendly and hostile entities within a protected area, according to an embodiment of the present invention.

An example of a surveillance system of the present invention deployed to protect a sensitive area is shown in FIG. 1. The surveillance sensor 10 is implemented as millimeter wave surveillance radar. Containers 11 are depicted as examples of high value assets in need of protection. These containers 11 are located within a secured area 12, defined by the fence 13. Although a fence is shown, the surveillance radar 10 makes it possible to protect the secured area 12 without the requirement for a surrounding fence. The secured area 12 may comprise an area that requires surveillance radar having a maximum detection range to survey the entire area. The surveillance sensor 10 is typically equipped with a rotationally scanning antenna that provides coverage of the secured area surrounding the containers 11. While the antenna described herein is rotationally scanned, the rotational means may be accomplished via mechanical rotation or electronically scanning the antenna. The secured area 12 may include terrain features, such as the rock formation 14, or man made structures (not shown) that generate fixed position returns for the surveillance sensor 10. Multiple "friendly", authorized personnel 15 and authorized vehicles 16 may have legitimate needs to perform duties within, or traverse the secured area. It is possible that unauthorized or hostile personnel or vehicles will enter the secured area 12; with an example being the hostile intruder 17. The purpose of the surveillance sensor 10 is to detect these intrusions and allow interdiction of any unauthorized or hostile intruder before any undesired consequences occur. Typically, the surveillance sensor 10 is coupled to a communication link (not shown), which relays the radar detection data to a processing facility 100 where the data is displayed for viewing by security personnel. The radar display usually depicts natural terrain features and manmade structures as well as any moving targets within the secured area. The processing facility 100 may be located within secured area 12 or may be located elsewhere.

The surveillance sensor 10 operating alone can detect the presence of static and moving objects (e.g. vehicles or personnel) within the secured area 12. However, it is incapable of determining if a detected target is a "friend" or "foe". What are needed are a method and the required additional support equipment (hardware and software) to allow identification of detected targets. The additional hardware should not add significantly to the overall cost of the surveillance system, nor require "friendly" personnel to be excessively burdened by heavy or cumbersome equipment. The additional equipment should allow specific identification of each authorized person or vehicle within the secured area. The surveillance system should be capable of presenting a display of both the physical features of the secured area and the location and identification of each authorized entity. Any additional targets detected can be assumed hostile.

The present invention, in its preferred embodiment, includes the surveillance sensor 10 of FIG. 1, the addition of an IFF unit 20 carried by each authorized person 15 or vehicle 16 within the secured area 12, the addition of a GPS receiver 30 at the surveillance sensor 10 location, and the method used to exploit the information provided by each of these subsystems. The surveillance sensor 10 comprises frequency modulated continuous wave (FM-CW) radar operating in the millimeter wave region of the electromagnetic spectrum. The radar includes a continuously rotating antenna that forms a beam characterized by a narrow beam width in azimuth and a beam width in elevation sufficient to provide beam impingement upon all objects within the secured area 12 that are in line of sight to the radar. The rate of beam rotation is sufficiently high to enable multiple detection of targets moving through the secured area for all anticipated target velocities. While the present invention is described using a FM-CW radar, any radar system capable of providing the desired target location accuracy may be used.

Figure 2:
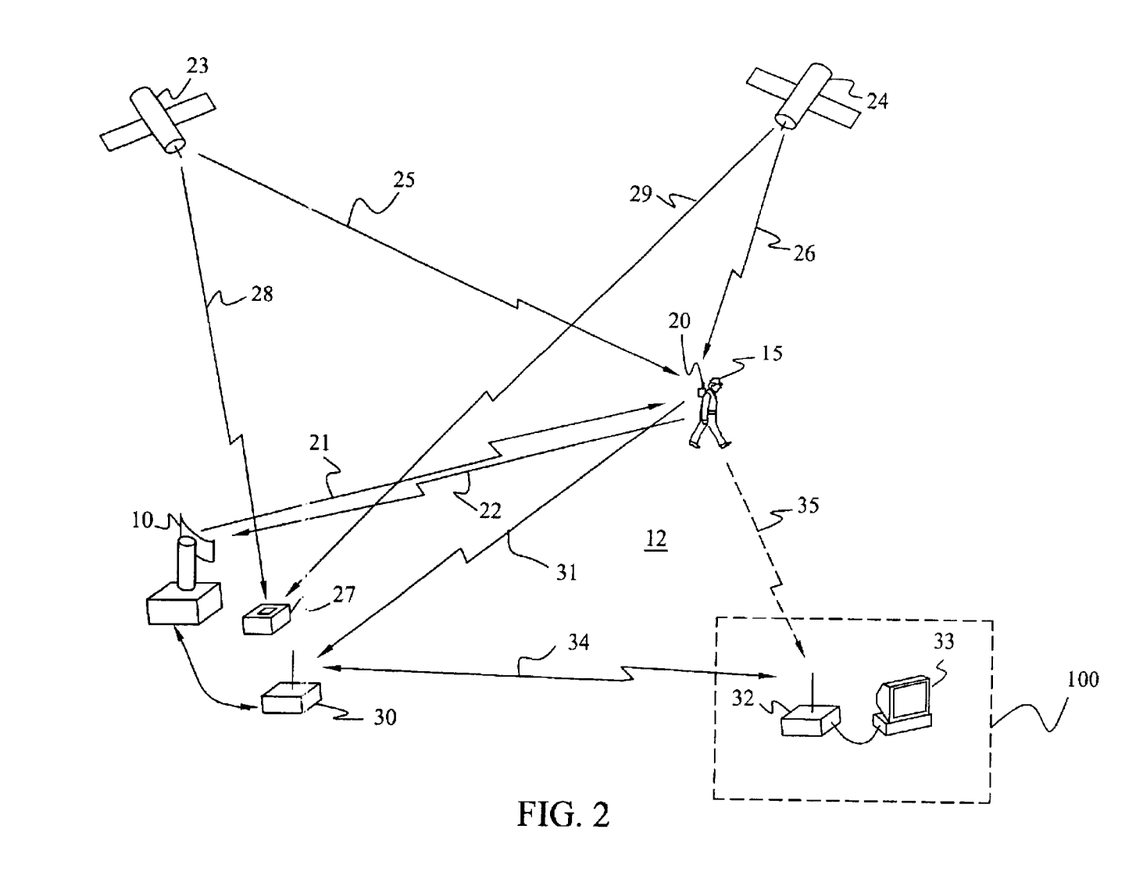
FIG. 2 is a depiction of the various electromagnetic ray paths that are employed by an embodiment of the present invention.

FIG. 2 is a depiction of the various electromagnetic ray paths that are employed by the present invention. Several of these rays are received by and others emanate from the IFF unit 20 carried by an authorized person 15 present in the secured area 12. Multiple authorized personnel may be present in the secured area with each equipped with an IFF unit 20. Similar ray paths to those shown traverse between the various transmission and reception nodes and each of the IFF units 20 existent within secured area 12. Ray 21 is included in the surveillance sensor 10 transmitted beam at the time that the beam is directed toward the authorized person 15. Ray 22 depicts that portion of the energy in the transmitted beam that is reflected from the authorized person and returned to the radar antenna whereupon it is detected, processed and displayed by the radar display 33. As the radar beam rotates, other targets within the secured area also reflect transmitted energy back to the radar antenna in the same manner as that for rays 21 and 22. If the IFF unit of the present invention is not used only rays 21 and 22 associated with each of the multiple targets of various types existent within the secured area will be present.

Figure 3:
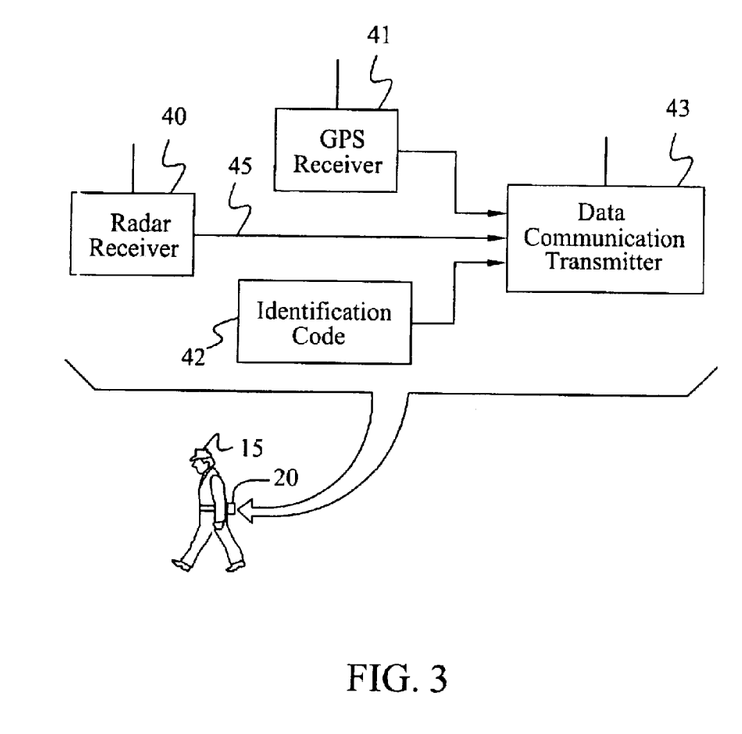
FIG. 3 depicts the subsystems that are included within the IFF unit 20, in accordance to an embodiment of the present invention.

The IFF unit 20 includes a global positioning system (GPS) receiver 41 illustrated in FIG. 3, and batteries to supply power to the GPS receiver and all other circuits within the unit. Referring to FIG. 2, GPS satellites 23 and 24 are depicted as two of the constellation of GPS satellites that circle the earth. A sufficient number of satellites are in orbit to provide multiple satellite, direct line-of-sight links to any geographical location on the surface of the earth. Rays 25 and 26 depict GPS signals received from GPS satellites 23 and 24 by the GPS receiver in IFF unit 20. Signals are also simultaneously received from other GPS satellites that are not shown. Included within the GPS receiver of the IFF unit is a data processor that is capable of using the information contained in the multiple GPS satellite signals to compute the current time and the GPS derived location of the IFF unit in terms of latitude, longitude, and altitude, or similar suitable coordinates. This positional data is continuously updated as the satellites move in orbit and the IFF unit 20 is changed in position.

In the preferred embodiment of the present invention, a GPS receiver 27 illustrated in FIG. 2 is collocated with the surveillance sensor 10. GPS receiver 27 receives the signals emanating from satellites 23 and 24 as depicted by rays 28 and 29, as well as additional signals from other GPS satellites that are not shown. GPS receiver 27 determines the current time and its GPS derived location by the same method and in the same coordinate system as that used by the GPS receivers in the IFF units. Both surveillance sensor 10 and GPS receiver 27 are coupled to the data communication unit 30. While the present invention uses GPS receiver 27, other location determining approaches may be used. The location may be a pre-surveyed location whose location data is known. Alternatively, an IFF 20 unit could be used to provide location data during system setup. What is important is that the location of the surveillance sensor 10 be known.

The IFF unit 20 includes a radar receiver 40 (shown in FIG. 3) capable of receiving a portion of the surveillance radar's transmitted beam, as depicted by ray 21 of FIG. 2, and thus determining when the radar's beam is directed toward the IFF unit. Also included within IFF unit 20 is a data communication transmitter 43. Each time the radar beam (Ray 21) is detected, the data communication transmitter 43 broadcasts a message that contains an identification code unique to the particular IFF unit, any other authentication data that may be required, and its GPS determined position and the time that the position was determined. Ray 31 defines the path of this transmission to the data communication unit 30 located near the surveillance radar 10. The data communication transmitter included in the IFF unit operates within a frequency band having desirable characteristics for data communication purposes within the environment of the secured area 12, and at an output power level sufficient to accomplish data transmission with a very low error rate. For the short distances, only a few milliwatts of power are required, thus minimizing the energy consumption from the batteries in the IFF unit.

In order to minimize signal collisions of multiple IFF units 20 that are collated within the Ray 21, the data communication transmitter 43 delays sending its message traffic by a unique delay time. For example, the delayed transmission could be a related to the IFF unit 20 serial number. When possible signal collision could occur without a delay in transmission when an authorized user with IFF 20 is in an authorized vehicle 16 with its IFF 20.

The data communication unit 30 illustrated in FIG. 2 includes a receiver capable of receiving the identification and position data from each of the IFF units 20 within the secured area 12. The data communication unit 30 combines into a composite data stream the surveillance radar 10 target detection data, the radar position data from GPS receiver 27, and the identification and position data from the IFF units 20. This data stream is sent to the data communication unit 32 that is collocated with the radar display 33 in the processing facility 100. Ray 34 represents this communication path. The communication path may be electromagnetic, optical or hard wired.

The data communication unit 32 and radar display 33 are often placed at a processing facility 100 whose location is remote from the secure area 12. The remote location is frequently an enclosure housing security personnel that monitor the activities in one or more secured areas. If the distance between the secured area 12 and the data communication unit 32 is sufficiently small, each of the IFF units 20 can transmit their identification and position data directly to the data communication unit 32. Ray 35 depicts this alternate arrangement of ray paths.

The ability of a GPS receiver (27 and 41) to accurately determine its position on the surface of the earth is limited by several factors. These include the position of the satellites, the number of satellites from which signals are being received, their elevation angle with respect to the horizon and the bearing to each. Other factors include the propagation effects of the ionosphere and troposphere, accuracy of ephemeris data, satellite clock drift, and multi-path effects. The result of the combination of these factors is that a GPS receiver will compute a position that is in error with respect to its true position. The position error can be defined by its magnitude and bearing from the true position of the GPS receiver. A magnitude of 10 to 20 meters is typical while the bearing may represent any direction. The position error will change as the factors producing the error change.

Multiple GPS receivers separated by no more than a few kilometers and having the same performance capability, will receive GPS signals from the same set of in-view GPS satellites. These GPS receivers are subjected to the same error producing factors when they derive their locations essentially simultaneously. Consequently, although each will compute a position that contains a position error, the position error for every GPS receiver will be substantially the same. Well known to those of skill in the art are algorithms that accept the position data of two locations on the earth's surface, defined, for example, in terms of their latitudes and longitudes, and compute the bearing and range of one with respect to the other with an accuracy limited only by the precision of the position data. Using these algorithms and the position data from two GPS receivers, the position of one with respect to another can be determined with an accuracy of substantially one meter in range and one meter of arc normal to the range vector.

The present invention generally associates the GPS derived location data received from each IFF unit with the location of a surveillance sensor 10 detected target or object. Then, any remaining radar detected targets or objects can be declared unauthorized or hostile targets or objects. The surveillance sensor 10 preferably has a target location range accuracy of one meter, and an azimuth accuracy of a few meters depending upon range and antenna beam width. A secured area 12 may contain many objects that constitute radar reflectors as well as a number of individuals 15 and vehicles 16 authorized to be in the area and thus equipped with IFF units 20. The resulting radar display of the secured area will contain many targets. If the GPS position reports from the IFF units were used alone with their inherent position errors having magnitudes of 10 to 20 meters, it would be difficult to associate each IFF unit report with its displayed radar return.

Individuals authorized to perform activities within the secured area 12 and thus equipped with IFF units 20 may often work in pairs or larger groups with spacing between individuals of from less than a meter to a few meters. The radar return from a closely spaced pair or group may be indistinguishable from that of a single individual. The reports from each IFF unit and their association with the correct radar return or returns will allow identification of each individual within the group.

Even though numerous targets are encountered in the secured area 12, the association of a particular sensor target or object detection with the correct IFF unit 20 report is made possible by collocating the GPS receiver 27 with the surveillance radar 10. The GPS derived positions, determined at substantially the same time, of GPS receiver 27 and any IFF unit can be supplied to the aforementioned algorithms to compute the bearing and range from the surveillance radar to that IFF unit. This bearing and range data can then be compared with radar derived bearing and range data to identify the correct radar return from the target equipped with that IFF unit. While the terms bearing and range data are used, any location identifying system can be used.

In the present invention, the identification and position data from each IFF unit 20, the surveillance sensor 10 target detection data, and the radar position data from GPS receiver 27 are combined into a composite data stream that is transmitted from the data communication unit 30 to data communication unit 32. The composite data stream is then passed to the radar display 33. The radar display is typically realized as a personal computer (PC) that includes the computational capability to resolve the composite data stream into its component parts, compute the range and bearing from the GPS receiver 27 to each reporting IFF unit 20, convert the radar data stream and IFF unit position data into appropriate graphics, and display the result on the PC monitor, or other suitable display device.

FIG. 3 provides details of the IFF unit 20 that includes a radar receiver 40, a GPS receiver 41, an identification code memory module 42, and a communication link transmitter 43. Separate antennas, each optimized for its frequency of operation, are mounted on the surface of the IFF unit and coupled to the receivers and to the communication link transmitter. The GPS receiver 41 is a commercially available unit that continuously supplies positional. The positional data is typically provided in UTM form, but can be in another format if preferred for data transmission and relative position computations. The communication link transmitter 43 is also a commercially available module. Features considered in selecting the GPS receiver 41 and the communication link transmitter 43 are small size, low power consumption, and compatibility with packaging with other modules in a convenient configuration for the IFF unit 20. Identification code memory module 42 includes a nonvolatile, re-programmable digital memory device having sufficient memory to store all the identification parameters that may be needed to uniquely identify the IFF unit of which it is a part, and to authenticate its use by the authorized person 15 to which it is assigned. Typically the identification parameters may include a unique identification code for the IFF unit, a "code-of-the-day" that is inserted daily or on a periodic basis, and a personal code inserted by the authorized person when beginning to use a particular IFF unit. The module 42 may also include a "dead-man switch" that will substitute an alarm code for the personal code if the IFF unit is removed from the authorized person without a proper shut down procedure being performed. These identification code segments are concatenated into an identification message that is supplied to the communication link transmitter 43.

The radar receiver 40 is capable of monitoring the portion of the millimeter wave spectrum in which the surveillance sensor 10 operates. When the radar main beam (Ray 21) is directed toward IFF unit 20, the increase in the radar signal amplitude is sensed and the radar receiver 40 generates a control signal 45 that is coupled to the communication link transmitter 43. Control signal 45 initiates the process whereby the identification message from the identification code memory module 42 and the position data from the GPS receiver 41, including the time of position determination, are concatenated into a message that is transmitted by the communication link transmitter 43. This transmission of identification and position is repeated each time the main beam of the surveillance radar antenna completes a revolution and again aims the main beam toward the IFF unit. Alternatively as a power saving method the transmission may need only occur every N times a Ray 21 is detected, where N may be a fixed number or may be a variable. For example, if a vehicle is not moving, i.e., parked then it may only respond every 10 seconds.

Figure 4:
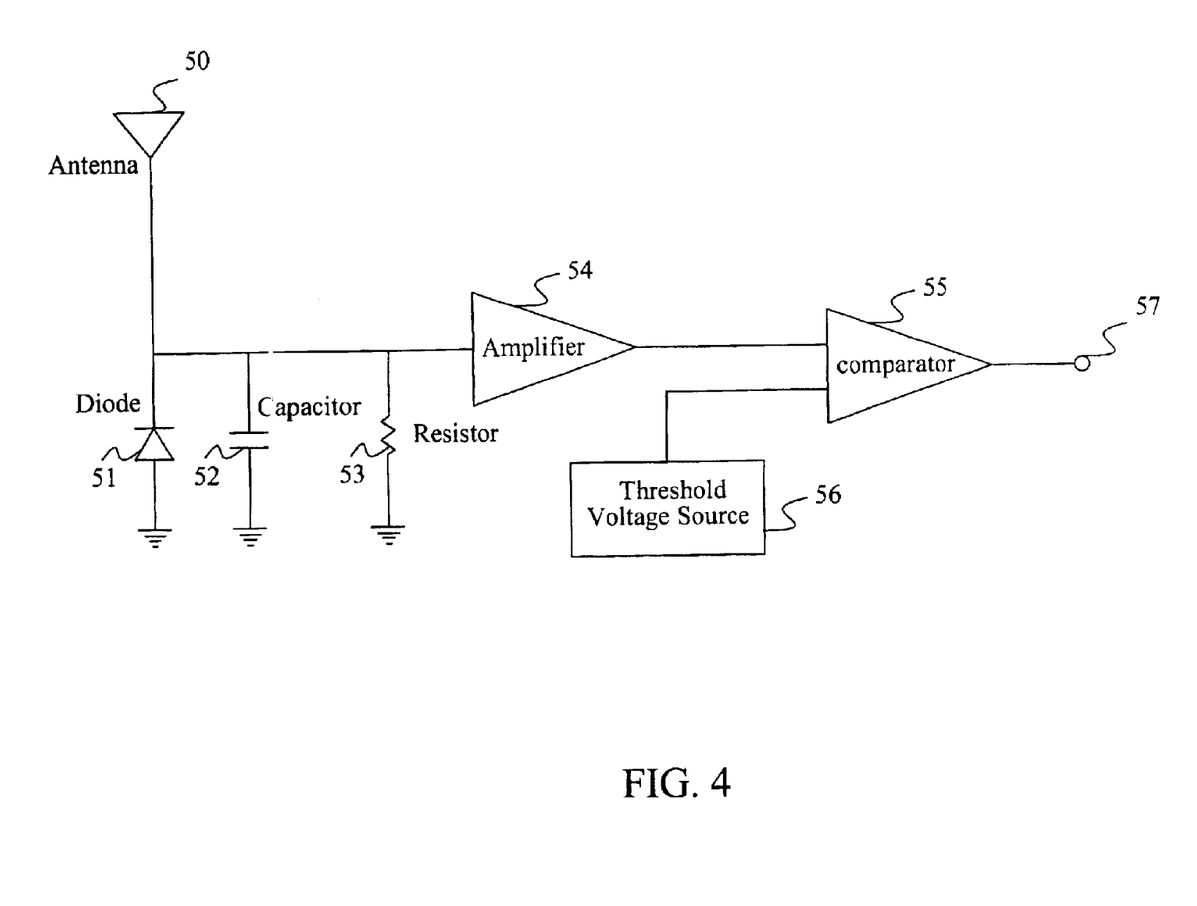
FIG. 4 illustrates a block diagram of the radar receiver 40, in accordance to the present invention.

FIG. 4 presents a block diagram of the radar receiver 40 that is included within the IFF unit 20. The antenna 50 is designed for sufficient collection of energy in that portion of the millimeter wave spectrum in which the surveillance radar 10 operates. The antenna 50 is coupled to a diode 51 in parallel with a capacitor 52 and a resistor 53. The diode 51 functions as a signal detector by acting as a half-wave rectifier that conducts to ground the negative half-wave excursions of the signal from the antenna and causes the positive half-wave excursions to accumulate a charge on the capacitor 52. When the main beam of the surveillance radar is directed at the antenna 50, the signal strength of the radar is typically sufficient to produce a charge of several millivolts on capacitor 52. Since the purpose of the radar receiver is to determine when the surveillance radar's main beam being directed at the IFF unit, the resistor 53 is included to bleed the charge off capacitor 52 after passage of the radar main beam.

Amplifier 54 is coupled to the capacitor 52 and has sufficient gain to produce an output of several volts when the charge on the capacitor reaches a maximum during the presence of the radar main beam. Comparator 55 is provided with two inputs, one from the voltage source 56 and the other from the output of amplifier 54. The voltage source 56 provides a constant threshold voltage that is significantly greater than the output voltage of amplifier 54 when only internal noise plus random signals are being received by antenna 50 and the main beam of the surveillance radar is not directed toward the IFF unit. The output of comparator 55 remains at substantially zero volts while the output of amplifier 54 is less than the threshold voltage from voltage source 56. The comparator output switches to its maximum value when the output of amplifier 54 exceeds the value of the threshold voltage in response to the reception of the main beam of the surveillance radar. The comparator output 57 comprises the control signal that commands the communication link transmitter 43 to transmit a message containing the IFF unit's identification and position data. The radar receiver 40 may be realized by the inclusion of components having a range of characteristics and parameter values. The process of component selection and component value determination to produce a functioning radar receiver is well known to those of skill in the art.

Figure 5:
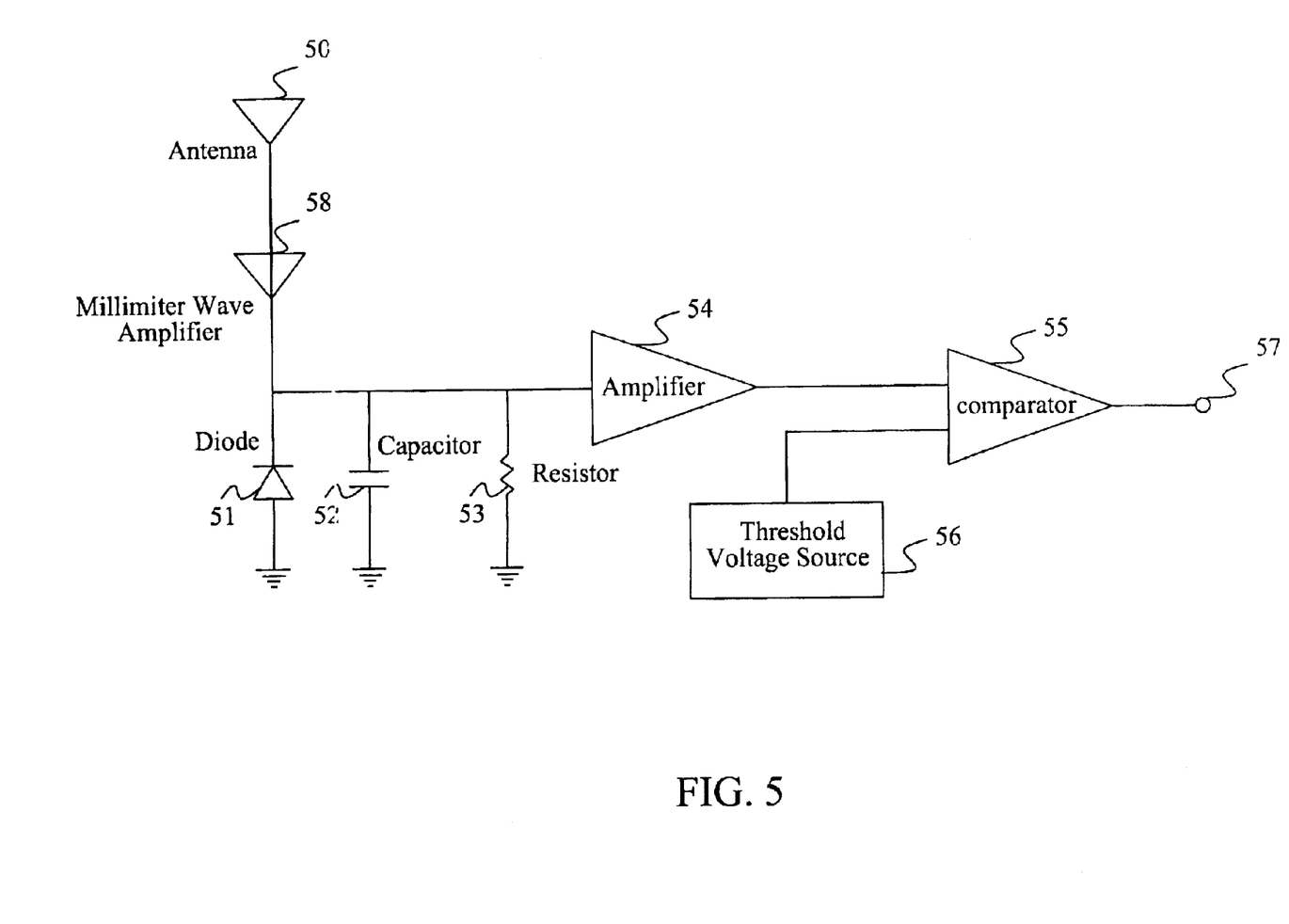
FIG. 5 illustrates a variation of the block diagram for the radar receiver illustrated in FIG. 4, in accordance to the present invention.

FIG. 5 shows an alternate configuration for the radar receiver 40. In this configuration, a millimeter wave amplifier 58 is added to the block diagram of FIG. 4 between the antenna 50 and the remainder of the circuit. In some installations of the present invention, the secured area 12 may be sufficiently large that the range from the surveillance radar 10 to some IFF units 20 may be so great that direct detection of the antenna 50 output is not possible. In that event, the addition of the millimeter wave amplifier 58 will increase the signal level to the diode detector and will greatly increase the reliability of determining the passage of the radar main beam.

While illustrative exemplary embodiments of the invention have been described, numerous variations and alternative embodiments will occur to those skilled in the art. For example, while data communication transmitter 43 shown in FIG. 3 is described as a transmitter, its function can also be provided by a bi-directional communication apparatus either networked or direct communication. Examples of bi-direction communication apparatus are an APCO 25 handset or a commercial cell telephone. Examples of a direct communication apparatus are a Citizen Band radio or a HaveQuick transceiver. Another example is variations in a direct path of rays 31 and 35 from IFF 20 to the data communication unit 30 or 32, illustrated in FIG. 2. It is not necessary that the communication link be restricted to a direct path. The communication depicted by rays 31 and 35 could be performed by a cellular based communication device (e.g. APCO 25 handset or cell telephone.) What is essential is that information from IFF 20 are communicated to the processing facility 100. Additionally, communication devices are now available with an internal GPS capability, so IFF unit 20 GPS function may be provide by the communication device's GPS unit. When a bi-directional communication network is used, the GPS derived location of IFF 20 can be transmitted upon request over the bi-directional communication network independent of surveillance sensor 10. The processing facility 100 may request a location update from an IFF 20 over the bi-directional communication network. By using existing bi-directional communication infrastructure and coupling a radar receiver to a bi-directional communication apparatus a low cost system can be built. Such variations and alternate embodiments are contemplated, and can be made without departing from the spirit and scope of the invention as defined in the appended claims. Therefore, it is manifestly intended that this invention be limited only by the claims and equivalents thereof.

What is claimed is:

1. A surveillance system, comprising:

at least one surveillance unit;

at least one Identification—Friend or Foe (IFF) unit located on at least one object; and at least one processing facility;

said at least one surveillance unit transmits surveillance signals to all objects within a surveillance area, and upon receipt of a reflection of said transmitted signals determines locations of said objects and communicates said determined locations to said at least one processing facility;

said surveillance signals that impinge on said at least one IFF unit on at least one object cause said IFF unit to broadcast messages containing identification and position information of said object having said IFF unit to said at least one processing facility;

said processing facility compares said broadcast messages from said IFF units and the communications from said at least one surveillance unit to determine all properly authorized locations of all objects within a surveillance area and to provide appropriate notice.

2. A surveillance system as set forth in claim 1, where said processing facility compares said locations of said objects with a stored list of objects to determine said object's properly authorized location within a surveillance area and to provide appropriate notice.

3. A surveillance system as set forth in claim 1, where said Identification—Friend or Foe (IFF) unit comprises:

a radar signal detector;

a GPS receiver; and a data communication transmitter;

said IFF unit tracks its location with said GPS receiver, and upon receiving an output from said radar signal detector triggers said data communication transmitter to broadcast a message containing identification information and position obtained from said GPS receiver.

4. A surveillance system as set forth in claim 3, where said data communication transmitter function is provided by a bi-directional communication device.

5. A surveillance system as set forth in claim 3, where the GPS receiver location function is provided for in a bi-directional communication device.

6. A surveillance system as set forth in claim 1, where said Identification—Friend or Foe (IFF) unit comprises:

a radar signal detector;

a GPS receiver; and a data communication transmitter contained within a bi-directional communication device;

where said IFF unit tracks its location with the GPS receiver and upon receiving a command over said bi-directional communication device causes the bi-directional transmitter to broadcast a message containing identification and position.

7. A method for identification interrogation, comprising the acts of:

a) transmitting at least one surveillance signal;

b) Determining location of at least one object based on a reflection of said transmitted surveillance signal from said object;

c) Broadcasting at least one message containing identification and position information from said at least one object; and d) Correlating said location information from said reflection signal with said broadcast information from said object to determine properly authorized location of said object within a surveillance area.

8. A method for identification interrogation as set forth in claim 7, comprising the act of:

Correlating said location information with a list of object locations to determine properly authorized location of said object within a surveillance area.

9. A method for identification interrogation as set forth in claim 7, comprising the act of:

transmitting location information with a pre-programmed identification information upon receiving an interrogation signal from said surveillance signal requesting identification.

* * * * *